(12) United States Patent
Sung et al.

(10) Patent No.: US 10,031,614 B2
(45) Date of Patent: Jul. 24, 2018

(54) TOUCH DISPLAY PANEL AND DRIVING METHOD THEREOF

(71) Applicant: InnoLux Corporation, Miao-Li County (TW)

(72) Inventors: Li-Wei Sung, Miao-Li County (TW); Chung-Le Chen, Miao-Li County (TW); Hung-Hsun Chen, Miao-Li County (TW); Yang-Chen Chen, Miao-Li County (TW); Chia-Hsiung Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 30 days.

(21) Appl. No.: 15/191,242

(22) Filed: Jun. 23, 2016

(65) Prior Publication Data
US 2017/0003804 A1    Jan. 5, 2017

Related U.S. Application Data

(60) Provisional application No. 62/188,088, filed on Jul. 2, 2015.

(30) Foreign Application Priority Data

Dec. 24, 2015   (TW) ............................... 104143519 A

(51) Int. Cl.
*G06F 3/041*   (2006.01)
*G09G 3/36*    (2006.01)
*G06F 3/044*   (2006.01)
*G02F 1/1333*  (2006.01)

(52) U.S. Cl.
CPC ........ *G06F 3/0416* (2013.01); *G02F 1/13338* (2013.01); *G06F 3/044* (2013.01); *G06F 3/0412* (2013.01); *G09G 3/3677* (2013.01); *G09G 3/3688* (2013.01); *G09G 3/3696* (2013.01);
(Continued)

(58) Field of Classification Search
CPC ........................... G06F 3/0412; G09G 3/3696
See application file for complete search history.

(56) References Cited

U.S. PATENT DOCUMENTS 9,158,406 B2    10/2015   Chiu et al.
9,383,862 B2 *   7/2016   Tokita ................... G06F 3/0412
(Continued)

FOREIGN PATENT DOCUMENTS

TW        201504868        2/2015

OTHER PUBLICATIONS

Chinese language office action dated Jun. 22, 2016, issued in application No. TW 104143519.

*Primary Examiner* — Xuemei Zheng
(74) *Attorney, Agent, or Firm* — McClure, Qualey & Rodack, LLP

(57) ABSTRACT

A touch display panel driven in a display period and a touch period alternately is provided, and includes a plurality of gate lines, each driven by a clock signal to output a scan signal during the display period and stop the scan signal during the touch period; and N dummy gate lines, each driven by a dummy clock signal to output a dummy scan signal before the display period is switched to the touch period, wherein at least one of rising edges of N dummy clock signals is synchronized with at least one of falling edges of the clock signals.

8 Claims, 14 Drawing Sheets

(52) U.S. Cl.
CPC ............... *G09G 2300/0809* (2013.01); *G09G 2310/0202* (2013.01); *G09G 2310/0286* (2013.01)

(56) References Cited

U.S. PATENT DOCUMENTS

| | | | |
|---|---|---|---|
| 2014/0085235 A1* | 3/2014 | Tokita | G06F 3/0412 345/173 |
| 2014/0132534 A1* | 5/2014 | Kim | G06F 3/0412 345/173 |
| 2015/0160766 A1* | 6/2015 | Park | G09G 3/3674 345/173 |

* cited by examiner

TOUCH DISPLAY PANEL AND DRIVING METHOD THEREOF

CROSS REFERENCE TO RELATED APPLICATIONS

This application claims the benefit of U.S. Provisional Application No. 62/188,088, filed on Jul. 2, 2015, the entirety of which is incorporated by reference herein.

This Application claims priority of Taiwan Patent Application No. 104143519, filed on Dec. 24, 2015, the entirety of which is incorporated by reference herein.

BACKGROUND OF THE INVENTION

Field of the Invention

The disclosure relates to a touch display panel and a driving method thereof, and in particular to a touch display panel and a driving method thereof capable of reducing display mura.

Description of the Related Art

The touch display panel is a new type of display panel that integrates the display function and the touch function. In the touch display panel, the panel IC and the touch IC are integrated together. This panel is manufactured in a new process provided by the liquid-crystal panel manufacturer.

In one kind of touch display panel, the common electrode (also called the grounded electrode) is divided into a plurality of electrode blocks which are arranged in a matrix. Each electrode block is used as a normal common electrode in the display period and as a touch sensing electrode in the touch period. The position of a touch object is determined by detecting the capacitance formed between the touch sensing electrode and the touch object.

FIG. 1 is a top view of a conventional touch display panel. As shown in FIG. 1, in a touch display panel 10, the area used to display images is called a display area 11. In the display area 11, the common electrode is divided into a plurality of common electrode blocks S1, S2, . . . , Sk, Sk+1, . . . , and Sm arranged in a matrix. Each common electrode block Sn (n equals to any integer from 1 to m+1) is connected to a driving chip via a metal wire Wn (n equals to any integer from 1 to m+1). The driving chip outputs a common voltage level to all of the common electrode blocks S1, S2, . . . , Sk, Sk+1, . . . , and Sm during the display period, and outputs a touch sensing signal to each common electrode block to determine whether the touch operation is performed during the touch period.

For this kind of touch display panel, the normal driving scheme for a display driving operation and a touch driving operation is a local driving scheme. Specifically, the display area of the panel is divided into a plurality of areas along the column direction, and the areas are driven in sequence. When one area is driven, the area is driven for displaying in a display period and for touch sensing in a touch period in sequence. In the touch period, the gate on panel circuits (also called GOP circuits) pause the outputting of the scan signal for the gate lines. In this way, each area has a pause period in which the scan signal is not supplied. However, for the serial-connected GOP circuits, the scan signal may not be transferred to the next stage because of the pause period. Mura may happen at the boundary of an area driven at the time just before the display period is switched to the touch period or just after the touch period is switched to the display period. Furthermore, because the display period is compressed, GOP circuits may be insufficiently charged and the driving capability is reduced.

In view of the above problems, the disclosure provides a touch display panel and a driving method thereof for solving the problems wherein the signal is not transferred, mura happens at the boundary of the areas, and the driving capability of the GOP circuits is reduced.

BRIEF SUMMARY OF THE INVENTION

A detailed description is given in the following embodiments with reference to the accompanying drawings.

The disclosure provides a touch display panel driven in a display period and a touch period alternately, including: a plurality of pixels disposed on the touch display panel; a plurality of gate lines, each of which is connected to the pixels in a row and driven by a clock signal to output a scan signal during the display period and stop the scan signal during the touch period; and N dummy gate lines, each of which is not connected to the pixels and driven by a dummy clock signal to output a dummy scan signal before the display period is switched to the touch period, where N is equal to or greater than 1, wherein at least one of rising edges of N dummy clock signals is synchronized with at least one of falling edges of the clock signals.

According to an embodiment, in the touch display panel, there are N clock signals driving the last N gate lines before the display period is switched to the touch period, wherein the rising edges of the N dummy clock signals are synchronized with the falling edges of the N clock signals respectively.

According to another embodiment, in the touch display panel, each of the N dummy gate lines are driven by a second dummy clock signal to output the dummy scan signal after the touch period is switched to the display period, wherein at least one of falling edges of N second dummy clock signals is synchronized with the at least one of rising edges of the clock signals. Further, in this embodiment, there are N clock signals driving the first N gate lines after the touch period is switched to the display period, wherein the falling edges of the N second dummy clock signals are synchronized with the rising edges of the N clock signals respectively.

The disclosure also provides a driving method of a touch display panel, including: driving the touch display panel in a display period and a touch period alternately in a frame; driving the touch display panel to enter the touch period at a first time point set in a first frame; and driving the touch display panel to enter the touch period at a second time point set in a second frame following the first frame, wherein the first time point set is different from the second time point set.

According to an embodiment, in the driving method of the touch display panel, the second time point set is determined randomly.

The disclosure also provides a driving method of a touch display panel. The touch display panel includes: a plurality of pixels disposed on the touch display panel; a plurality of gate lines, each of which is connected to the pixels in a row; and N dummy gate lines, each of which is not connected to the pixels, wherein N is equal to or greater than 1. The driving method of the touch display panel includes: driving the touch display panel in a display period and a touch period alternately; driving the plurality of gate lines by a plurality of clock signals to output a scan signal respectively during the touch period; driving the N dummy gate lines by N dummy clock signal to output a dummy scan signal before the display period is switched to the touch period; and synchronizing at least one of rising edges of the N dummy clock signals with at least one of falling edges of the clock signals.

According to an embodiment, in the driving method of the touch display panel, there are N clock signals driving the last N gate lines before the display period is switched to the touch period, wherein the rising edges of the N dummy clock signals are synchronized with the falling edges of the N clock signals respectively.

According to another embodiment, the driving method of the touch display panel further includes: driving the N dummy gate lines by N second dummy clock signal to output the dummy scan signal after the touch period is switched to the display period; and synchronizing at least one of falling edges of the N second dummy clock signals with at least one of rising edges of the clock signals. Further, in this embodiment, there are N clock signals driving the first N gate lines before the touch period is switched to the display period, wherein the falling edges of the N second dummy clock signals are synchronized with the rising edges of the N clock signals respectively.

By utilizing the above mentioned touch display panel and the driving method thereof, the mura located at the boundary of the areas of the conventional touch display panel can be reduced.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The following description is of the contemplated mode of carrying out the disclosure. This description is made for the purpose of illustrating the general principles of the disclosure and should not be taken in a limiting sense. The scope of the disclosure is determined by reference to the appended claims.

Figure 1:
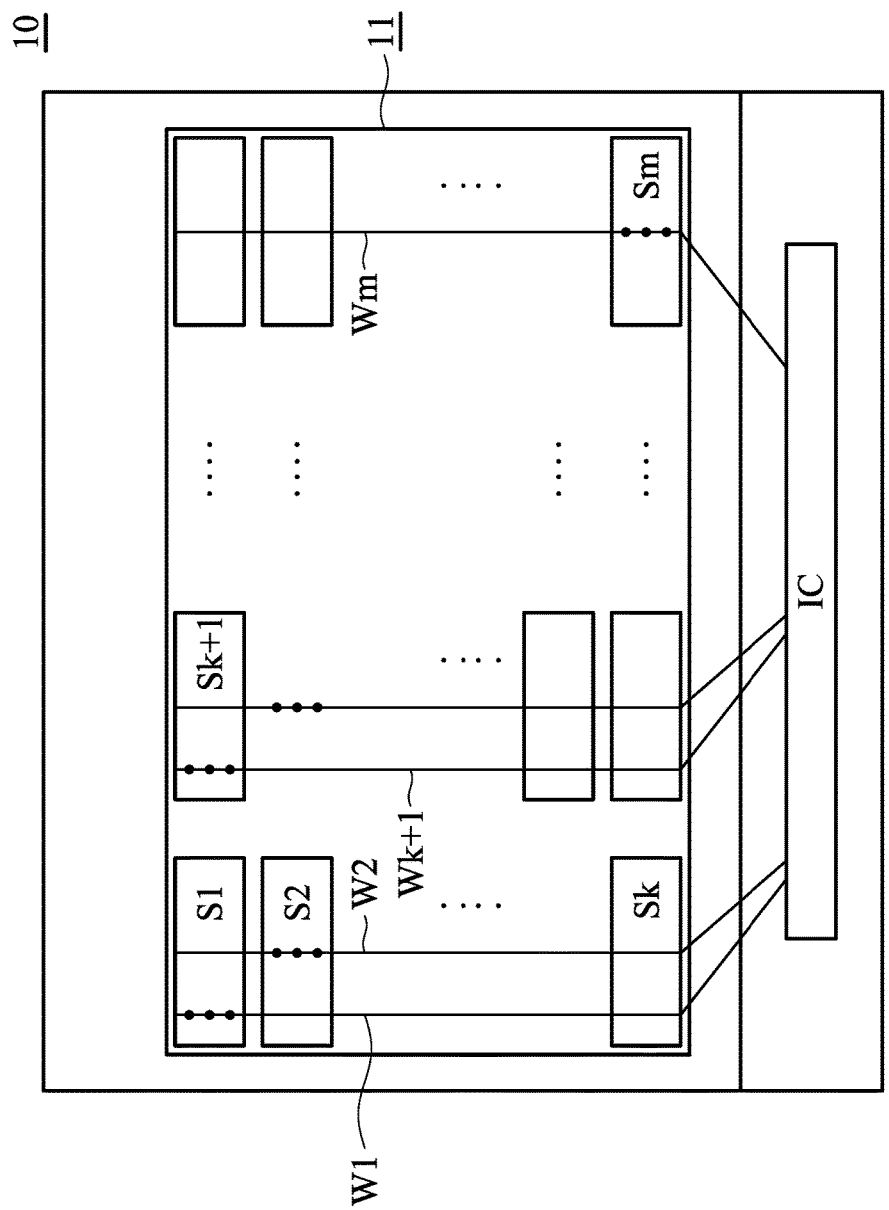
FIG. 1 is a top view of a conventional touch display panel.
Figure 2:
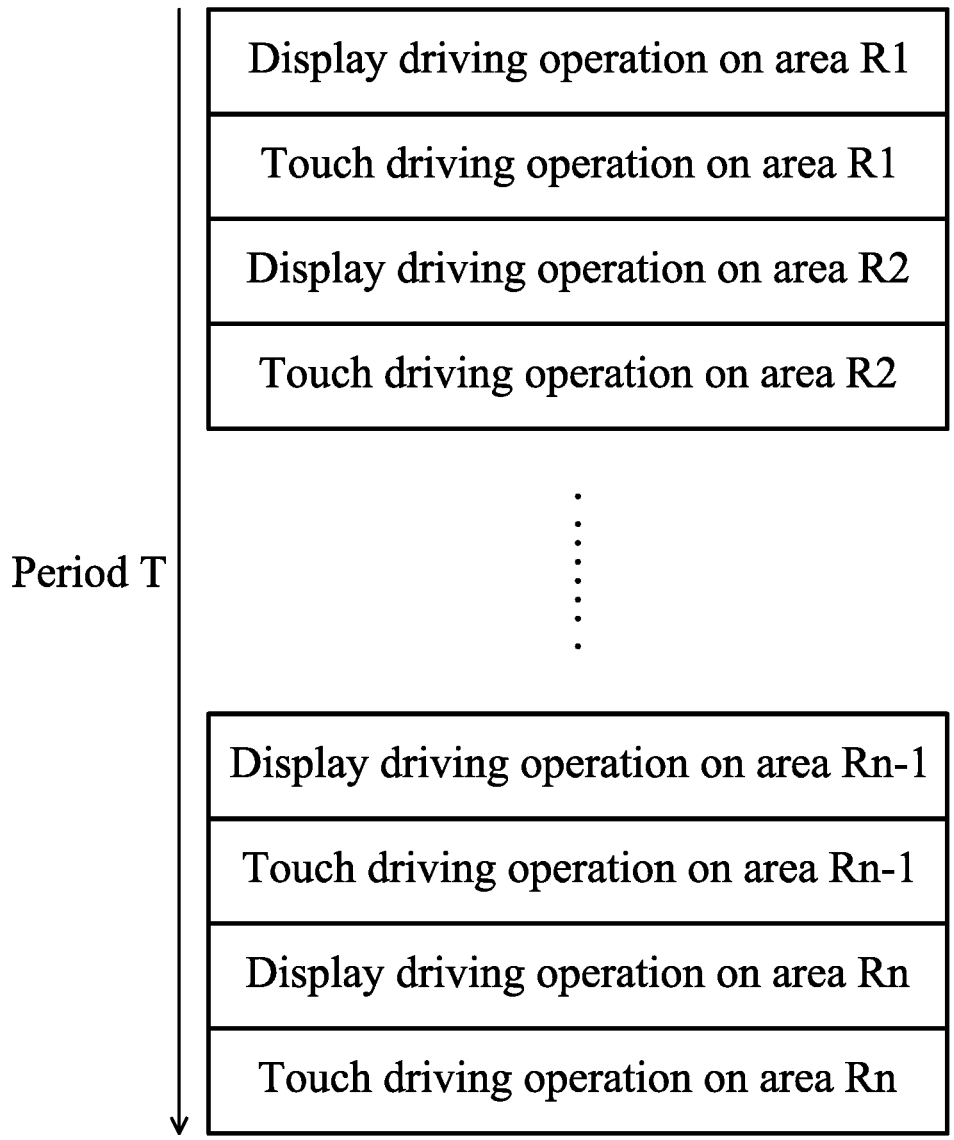
FIG. 2 is a schematic diagram for illustrating a local driving scheme performed for the touch display panel.

FIG. 2 is a schematic diagram for illustrating a local driving scheme performed for the touch display panel. It is assumed that the display area of a touch display panel 10 is divided into several (for example, n) areas R1, R2, . . . , Rn-1, and Rn, the driving scheme for the touch display panel 10 is shown in FIG. 2. Firstly, the area R1 is driven for displaying, in which gate lines located in the area R1 output scan signals in sequence, After the display driving is finished, the area R1 is driven for touch sensing to determine whether any of the common electrode blocks in the area R1 is touched. Then the area R2 next to the area R1 is driven for displaying and then driven for touch sensing. The driving scheme is continued in the same way until the display driving operation and the touch driving operation for the area Rn are finished. The period that the display driving operation and the touch driving operation are performed once for all areas is T, that is equal to a complete frame. If the driving frequency for displaying of the touch display panel 10 is 60 Hz, T is 16.6 ms.

Figure 3:
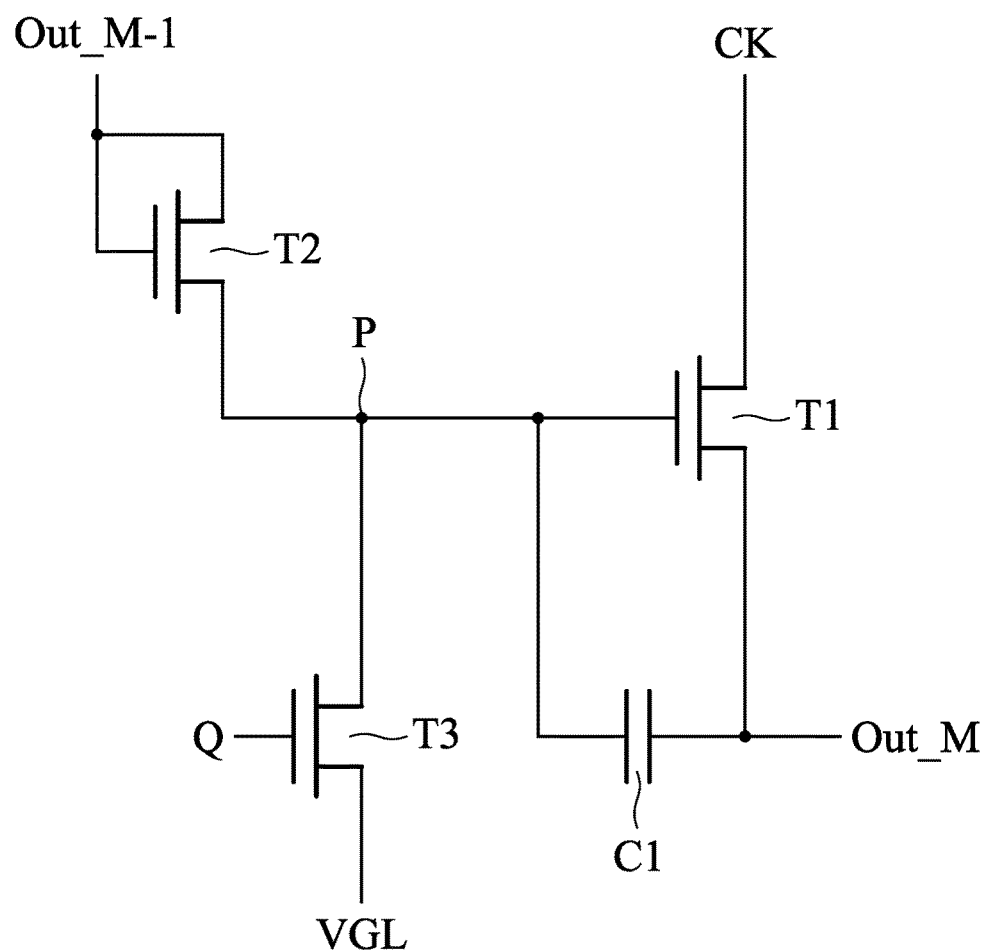
FIG. 3 is a circuit diagram of a shift register of GOP circuits.
Figure 4:
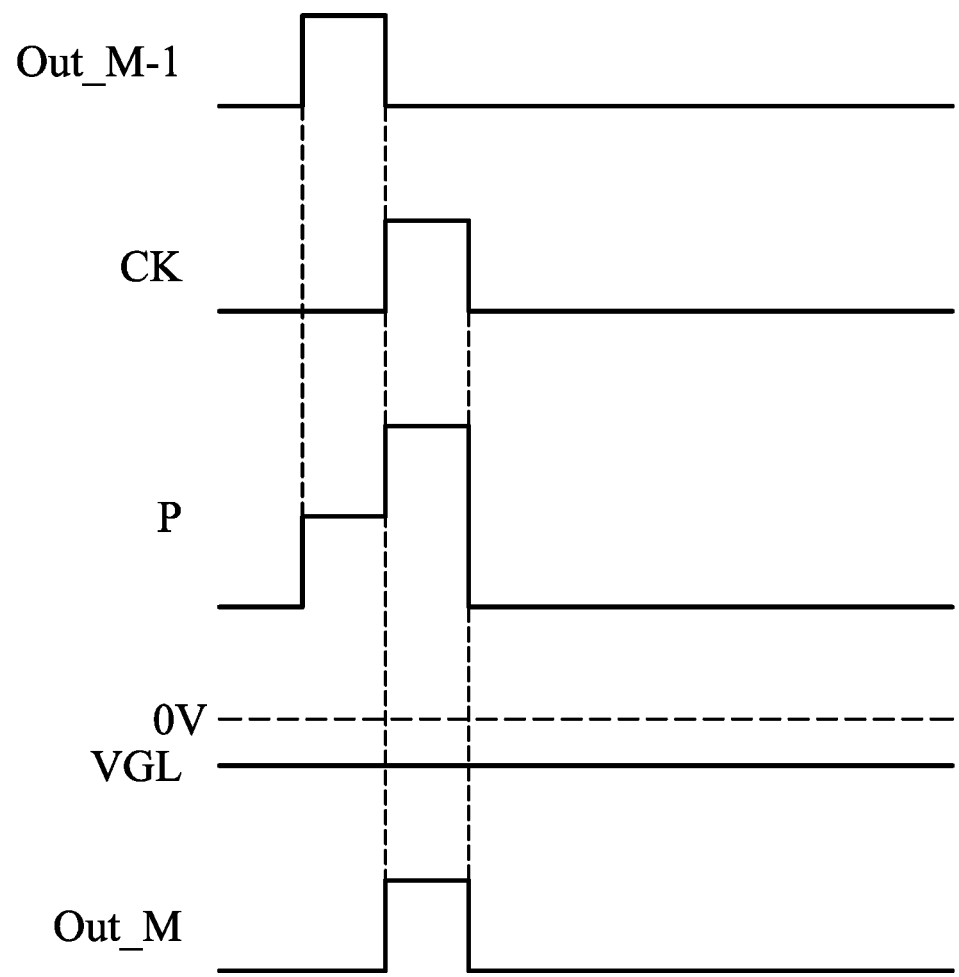
FIG. 4 is a diagram showing the voltage waveform at each node of the shift register shown in FIG. 3.

FIG. 3 is a circuit diagram of a shift register of GOP circuits. FIG. 4 is a diagram showing the voltage waveform at each node of the shift register shown in FIG. 3. It is assumed that the basic structure of an M-stage shift register SF_M includes three transistors T1, T2, and T3, and a capacitor C1. The transistor T1 is connected between a clock signal input terminal CK and an output terminal Out_M, and the control terminal of the transistor T1 is connected to a nod P. The transistor T1 is used to output a scan signal during a selection period of an M-th gate line connected to the M-stage shift register SF_M. The transistor T2 is diode-connected between the previous output terminal Out_M-1 and the node P. The transistor T3 is connected between the node and a low voltage node VGL, and a control terminal Q of the transistor T3 controls the time when the voltage level of the node P is pulled down to a voltage level (as shown in FIG. 4, the voltage level is usually negative) supplied by the low voltage node VGL. The capacitor C1 is connected between the node P and the output terminal Out_M. In the cases that the scan for displaying is performed continuously (not the local driving scheme), the waveform at each node is shown in FIG. 4. The voltage level of the node P is raised step by step in response to the successive input signals from the previous output terminal Out_M-1 and the clock signal input terminal CK, and such that the output terminal Out_M outputs a pulse as a scan signal.

Figure 5:
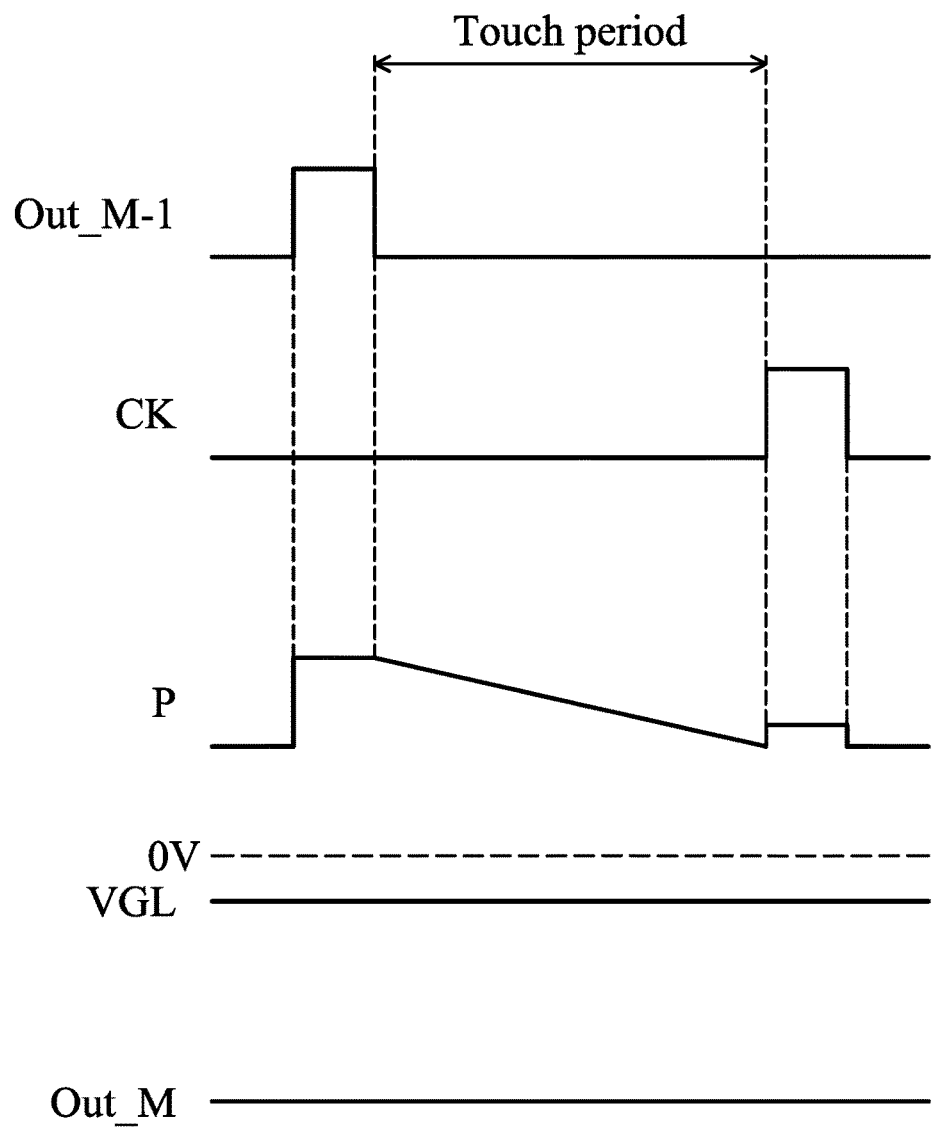
FIG. 5 is a diagram showing the voltage waveform at each node of the shift register shown in FIG. 3 and utilized in a touch display panel driven with the local driving scheme.

However, if the touch display panel driven with the local driving scheme and the shift register shown in FIG. 3 is connected to the first scan line of a certain area, the waveform at each node is shown in FIG. 5. When the last gate line of the previous area is scanned and the display driving operation for the previous area is finished, the scan signal is input to the previous output terminal Out_M-1 of the first shift register SF_M of the present area, and the previous area is driven for touch sensing. Because the GOP circuits don't output scan signals during the touch period, the clock signal is input to the clock signal input terminal CK only after the touch driving operation for the previous area is finished. In this way, the interval between the input signal from the previous output terminal Out_M-1 and the input signal from the clock signal input terminal CK is too long, so the voltage level of the node P is reduced because of leakage of electricity. If the voltage level of the node P is reduced too much, the transistor T1 may not be conductive completely when the clock signal is input to the clock signal input terminal CK, and thus the scan signal may not be sent out from the output terminal Out_M.

Figure 6A:
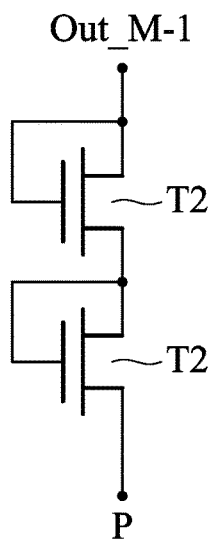
FIGS. 6A-6C are circuit diagrams showing a portion of an improved shift register in accordance with embodiments of the disclosure.
Figure 6B:
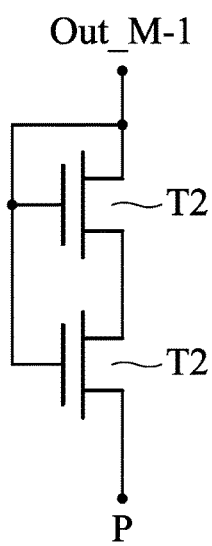
Figure 6C:
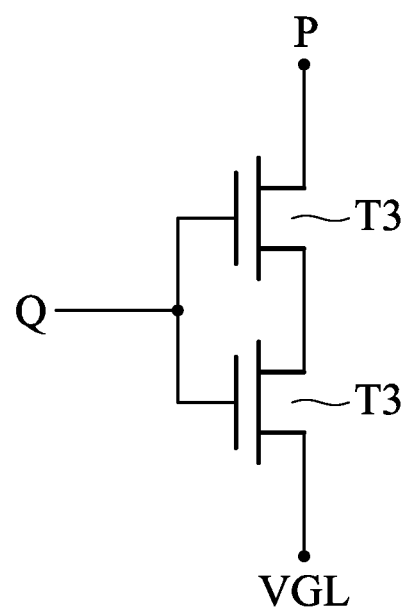
Figure 6D:
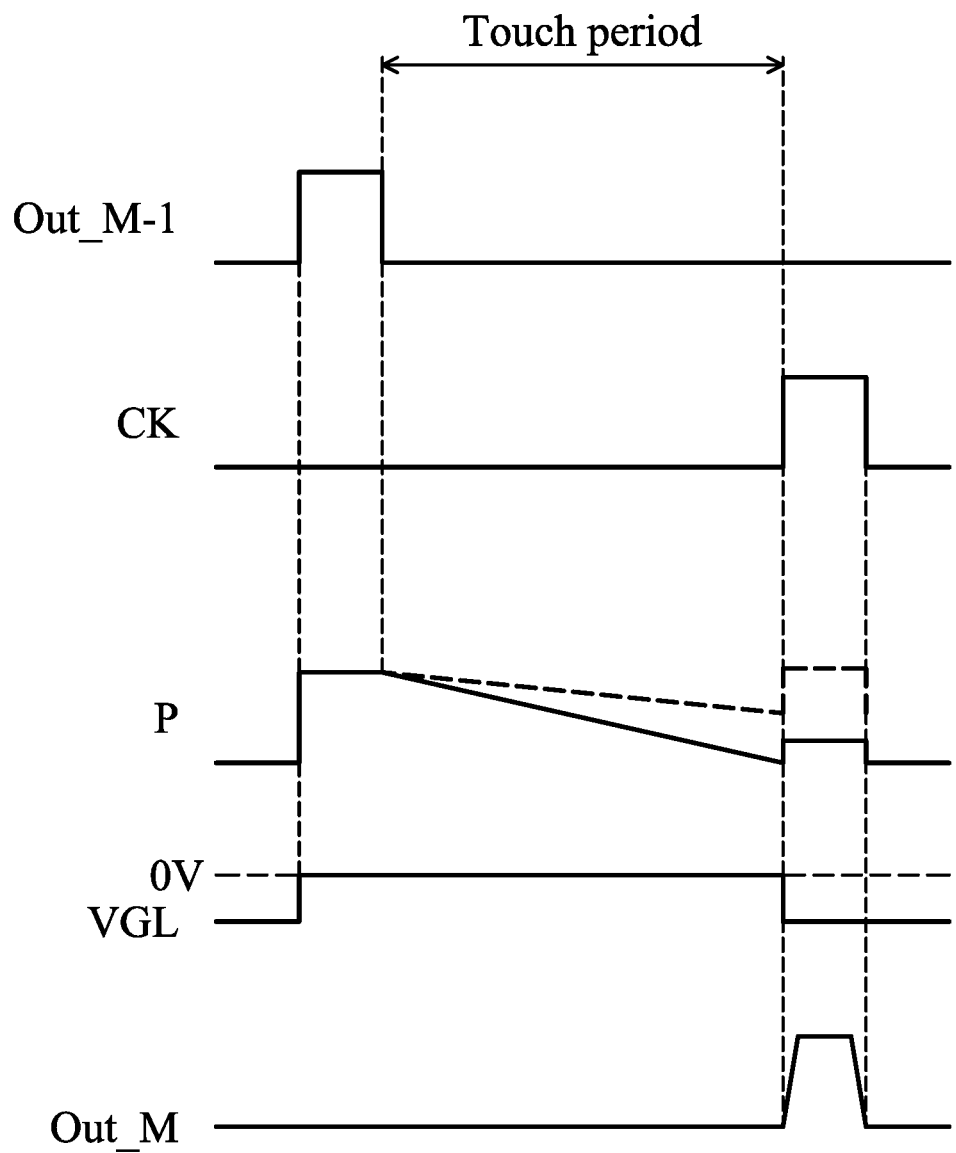
FIG. 6D is a diagram showing the voltage waveform at each node of the improved shift register utilized in a touch display panel driven with the local driving scheme in accordance with the embodiments of the disclosure.

To solve the problem of the scan signal not being transferred, the disclosure provides the following solutions: (1) Increase the capacitance of the capacitor C1 to slow down the leakage of the node P. (2) Change the transistor T2 or T3 to multiple transistors connected in series to increase the cross voltage or impedance of the transistor T2 or T3 to decrease the amount of leakage current. Examples of changing the transistor T2 to multiple transistors connected in series are shown in FIGS. 6A and 6B. An example of changing the transistor T3 to multiple transistors connected in series is shown in FIG. 6C. FIG. 6A-6C show example of two transistors connected in series, but there can be more than two number of transistors connected in series. (3) Increase the channel length of the transistor T2 or T3 to increase the cross voltage or impedance of the transistor T2 or T3 to decrease the amount of leakage current. (4) Couple a high voltage level to the input terminal OUT_M−1 of the transistor T2 to keep the voltage level of the node P. (5) Raise the voltage of the low voltage node VGL to, for example, 0V during the touch period. Specifically, as the voltage waveform of each node shown in FIG. 6D, the voltage of the low voltage node VGL is raised from a negative to 0V during the touch period, so the voltage difference of the node P and the voltage node VGL is reduced. The leakage of the node P is relieved (as shown by the waveform of the node P represented by the dotted line).

On the other hand, it is also possible to change the driving scheme of the touch display panel. The local driving scheme is not utilized, which means the entire display area is driven for displaying and then driven for touch sensing. The touch period is arranged in the blanking period located between two adjacent frames to avoid the interruption of the display driving operation before one complete image is refreshed.

In addition, an issue can be found in FIG. 6. Even the scan signal can be output from the output terminal Out_M, the rising edge and falling edge of the pulse of the scan signal is oblique. This, especially the falling edge of the pulse, influences the magnitude of voltage to be written into pixels and makes the pixel row display abnormally. This is the reason why mura happens at the boundary of the areas in the conventional art.

To solve the problem of display mura due to the distortion of the scan signal, the disclosure provides two solutions: (1) Increase the channel width-to-length ratio of the transistor T1 of the shift register SF_M located at the boundary of the areas. Therefore, the driving capacity of the transistor T1 can be increased so as to improve the distortion of the scan signal output from the output terminal Out_M of the shift register SF_M. (2) Vary the time when the touch display panel enters the touch period, such that the boundary mura will be distributed averagely to the entire displayed image and the human eye cannot distinguish the mura not located at a particular location.

Figure 7:
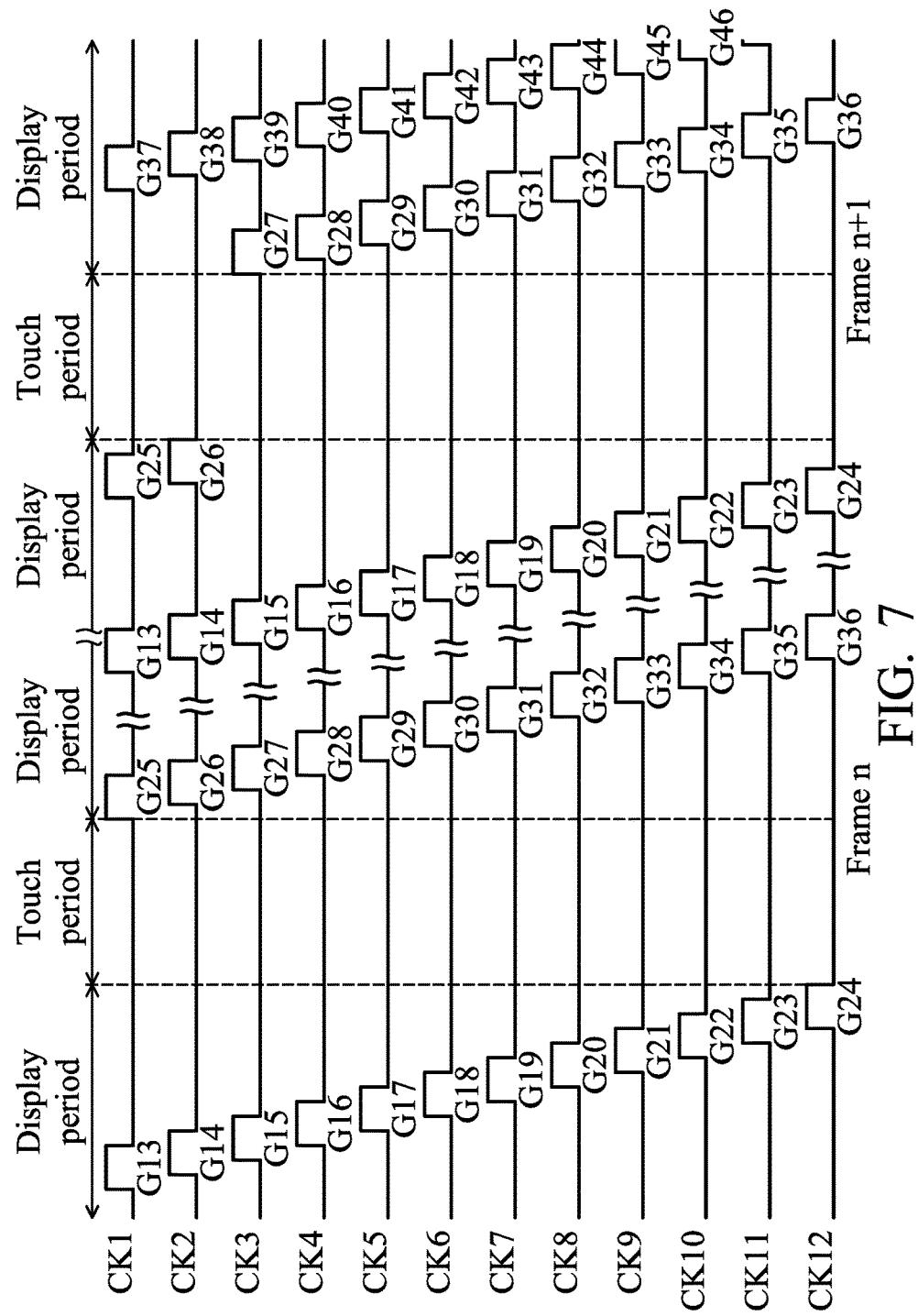
FIG. 7 is a diagram for illustrating that the time when the touch period is entered is varied in two adjacent frames.

FIG. 7 is a diagram for illustrating that the time when the touch period is entered is varied in two adjacent frames. As shown in FIG. 7, it is assumed that twelve clock signals CK1~CK12 are respectively input into the shift registers of twelve stages and those shift registers respectively output twelve scan signals for twelve gate lines. In the frame n, the clock signals CK1~CK12 make twelve shift registers output scan signals for the gate lines G13~G24 during the display period, then the touch period begins. After the touch period, the clock signals CK1~CK12 make the next twelve shift registers output scan signals for the gate lines G25~G36 during the display period. However, in the next frame, the clock signals CK1~CK12 make fourteen shift registers output scan signals for the gate lines G13~G26 during the display period, then the touch period begins. After the touch period, the clock signals CK1~CK12 make the next ten shift registers output scan signals for the gate lines G27~G36 during the display period. It can be seen from FIG. 7 that in the frame n the time when the touch period is entered is after the gate line G24 is scanned, and in the frame n+1 the time when the touch period is entered is after the gate line G26 is scanned. The touch period can be shifted by varying the number of gate lines scanned in the display period.

Figure 8:
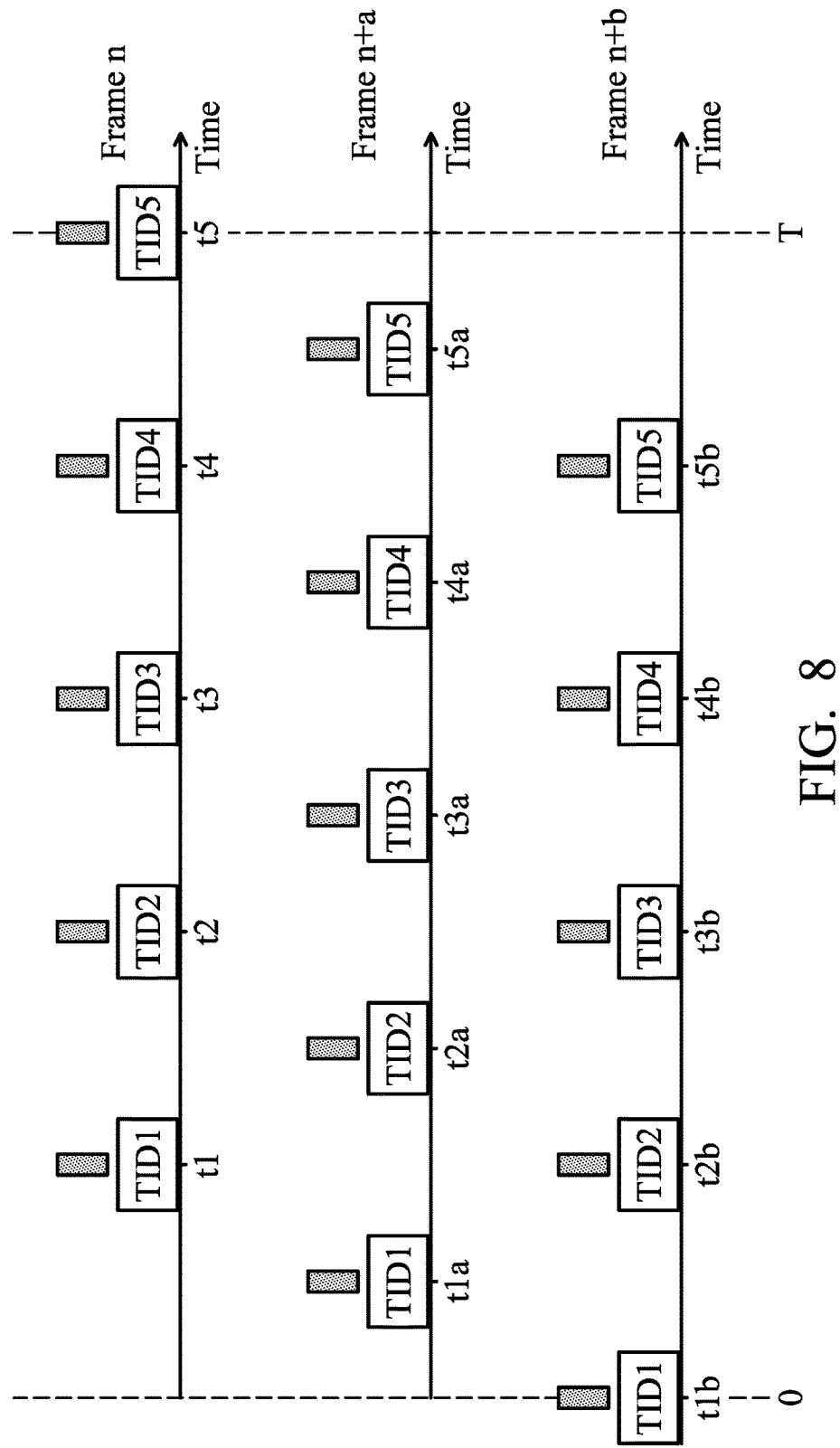
FIG. 8 is a diagram for illustrating that the time when the touch period is entered is varied in multiple frames.

FIG. 8 is a diagram for illustrating that the time when the touch period is entered is varied in multiple frames. It is assumed that there are five touch periods TID1, TID2, TID3, TID4, and TID5 in a frame period T. In frame n, the time points when five touch periods TID1, TID2, TID3, TID4, and TID5 begin are t1, t2, t3, t4, and t5. In frame n+a, the time points when five touch periods TID1, TID2, TID3, TID4, and TID5 begin are t1a, t2a, t3a, t4a, and t5a. In frame n+b, the time points when five touch periods TID1, TID2, TID3, TID4, and TID5 begin are t1b, t2b, t3b, t4b, and t5b. Because the time points when the touch periods begin are staggered, the boundary mura can be distributed averagely to the entire displayed image and make it harder for the human eye to distinguish. Furthermore, the time points when five touch periods TID1, TID2, TID3, TID4, and TID5 begin for each frame can be determined randomly.

Figure 9:
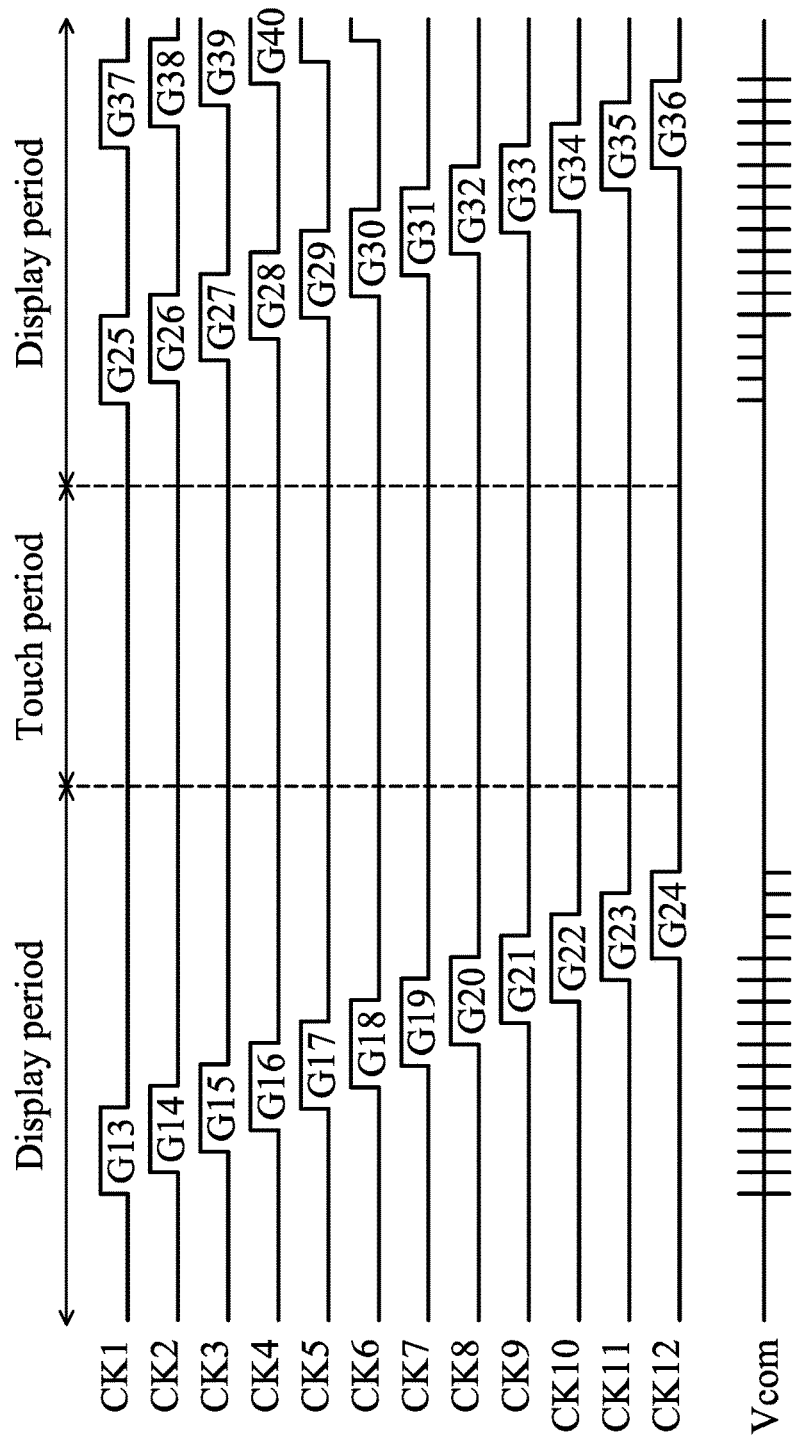
FIG. 9 is a diagram showing the output time of clock signals of a conventional touch display panel and the state of coupling occurring on the common electrode.

FIG. 9 is a diagram showing the output time of clock signals of a conventional touch display panel and the state of coupling occurring to the common electrode. In the display period, the rising edge and the falling edge of the clock signals CK1~CK12 are coupled to the voltage Vcom of the common electrode (whether the common electrode is formed at the TFT side or the color filter side). In the ordinary condition, each falling edge of a clock signal is overlapped with a rising edge of another clock signal. Therefore, the voltage coupling occurring to the common electrode is offset. However, when the display period is being switched to the touch period, as shown in FIG. 9, the falling edges of the last four clock signals CK9~CK12 before the touch period is entered cannot be offset, and making an downward fluctuation in the voltage Vcom of the of the common electrode. The same situation also occurs when the touch period has just been switched to the display period. The rising edges of the first four clock signals CK1~CK4 after the display period is entered cannot be offset, and making a downward fluctuation in the voltage Vcom of the common electrode. The voltage fluctuation of the common electrode changes the cross voltage of the liquid crystal layer, which also produces boundary mura between the adjacent areas.

Figure 10:
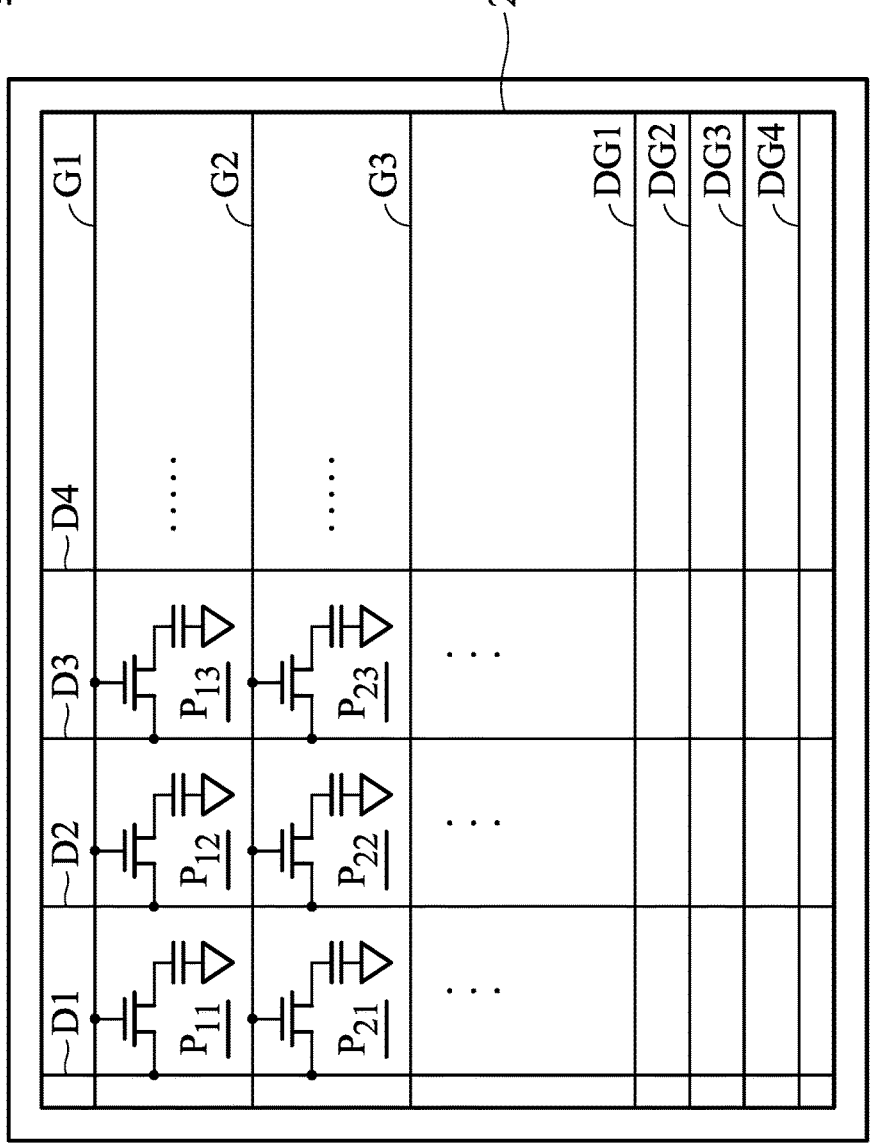
FIG. 10 is a diagram showing a touch display panel in accordance with an embodiment of the disclosure.

To solve this problem, the disclosure arranges dummy gate lines supplying signals to offset the voltage fluctuation of the common voltage. FIG. 10 is a diagram showing a touch display panel in accordance with an embodiment of the disclosure. The display 21 of a touch display panel 20 includes a plurality of gate lines G1, G2, . . . arranged in parallel with the row direction; a plurality of data lines D1, D2, D3, D4 . . . arranged in parallel with the column direction; a plurality of pixels P11, P21, P12, P22, P13, P23, . . . located at the intersection of any one of the gate lines and any one of the data lines; and at least one dummy gate line (for example, four dummy gate lines DG1, DG2, DG3, and DG4) arranged in parallel with the row direction. The dummy gate lines DG1, DG2, DG3, and DG4 output a scan signal respectively at the time points when dummy clock signals C1, C2, C3, and C4 are respectively input to the shift registers connected to the dummy gate lines DG1, DG2, DG3, and DG4. The dummy gate lines DG1, DG2, DG3, and DG4 are not connected to the pixels. In FIG. 10, the dummy gate lines DG1, DG2, DG3, and DG4 are disposed close to the lower edge of the display area 21. However, as long as the aperture ratio of the display area 21 is not reduced too much, the dummy gate lines DG1, DG2, DG3, and DG4 can be disposed at any position on the panel, even outside the display area 21.

Figure 11:
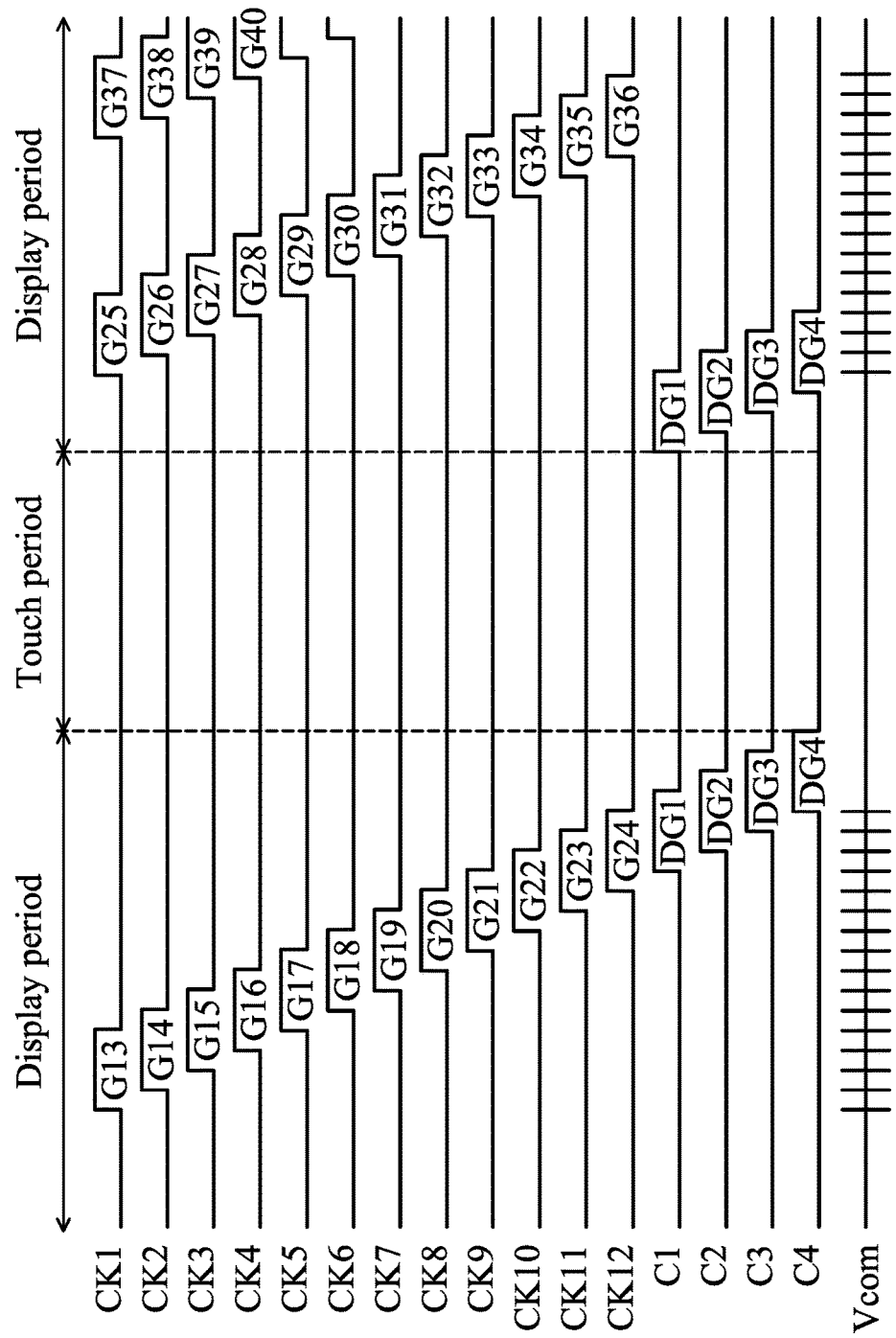
FIG. 11 is a diagram showing the output time of clock signals of the touch display panel in accordance with an embodiment of the disclosure and the state of coupling occurring on the common electrode.

The driving scheme for the dummy gate lines DG1, DG2, DG3, and DG4 is shown in FIG. 11. Before the display period is switched to the touch period, the time point of the rising edge of the dummy clock signal C1 is located at the time point of the falling edge of the clock signal CK9. The time point of the rising edge of the dummy clock signal C2 is located at the time point of the falling edge of the clock signal CK10. The time point of the rising edge of the dummy clock signal C3 is located at the time point of the falling edge of the clock signal CK11. The time point of the rising edge of the dummy clock signal C4 is located at the time point of the falling edge of the clock signal CK12. In this way, the time points of the falling edges of the last four clock signal CK9~CK12 before the touch period is entered are overlapped with the time points of the rising edges of the dummy clock signal C1~C4 used for the dummy gate lines DG1, DG2, DG3, and DG4. Because the voltage coupling occurring to the common electrode is offset, there are no voltage fluctuations in the voltage Vcom of the common electrode when the display period is being switched to the touch period, and the problem of boundary mura is solved.

Similarly, after the touch period is switched to the display period, the time point of the falling edge of the dummy clock signal C1 is located at the time point of the rising edge of the clock signal CK1. The time point of the falling edge of the dummy clock signal C2 is located at the time point of the rising edge of the clock signal CK2. The time point of the falling edge of the dummy clock signal C3 is located at the time point of the rising edge of the clock signal CK3. The time point of the falling edge of the dummy clock signal C4 is located at the time point of the rising edge of the clock signal CK4. In this way, the time points of the rising edges of the first four clock signal CK1~CK4 after the display period is entered are overlapped with the time points of the falling edges of the dummy clock signal C1~C4 used for the dummy gate lines DG1, DG2, DG3, and DG4. Because the voltage coupling occurring to the common electrode is offset, there are no voltage fluctuations in the voltage Vcom of the of the common electrode when the touch period is being switched to the display period, and the problem of boundary mura is solved.

The embodiment uses four dummy clock signals C1~C4 to drive four dummy gate lines DG1, DG2, DG3, and DG4 to offset the voltage fluctuation of the common electrode due to voltage coupling, but the number of dummy gate lines are not limited. The number of dummy gate lines depends on the number of scan signals generated during a period of a pulse width of the clock signals CK1~CK12. In the embodiment, there are four scan signals output during the period of a pulse width of the clock signals CK1~CK12. Therefore, the embodiment design four dummy clock signals C1~C4 for offset. In addition, the embodiment outputs the dummy clock signals C1~C4 before the display period is switched to the touch period and after the touch period is switched to the display period. However, if the fluctuation of the voltage Vcom of the common electrode at the time when the touch period has been switched to the display period does little influence on displaying, the disclosure can output the dummy clock signals C1~C4 only before the display period is switched to the touch period.

Figure 12:
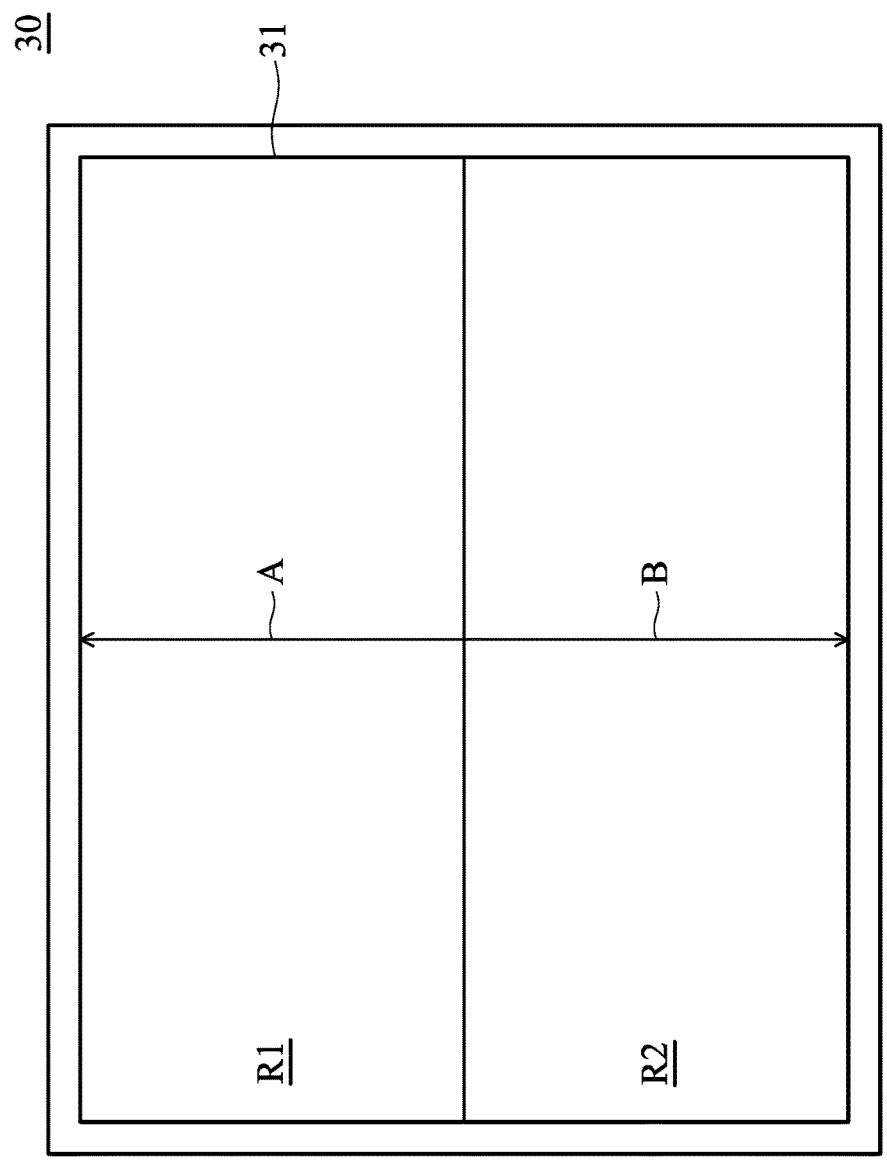
FIG. 12 is diagram for illustrating a scan scheme in accordance with an embodiment of the disclosure.

Furthermore, if the area of the touch display panel is only divided into two areas: an upper area and a lower area, the problem of boundary mura can be solved by changing the scanning direction. FIG. 12 is diagram for illustrating a scan scheme in accordance with an embodiment of the disclosure. As shown in FIG. 12, the display area 31 of the touch display panel 30 is divided into two areas R1 and R2 for the local driving scheme. During the display period, the scanning operation is started form the middle of the screen and the gate lines of the area R1 are scanned line by line along a first direction A (for example, an upward direction) until the upper edge of the display area. Then the touch period is entered, and the area R1 is driven for touch sensing. After the touch period, the display period is entered again and the scanning operation is started form the middle of the screen and the gate lines of the area R2 are scanned line by line along a second direction B (for example, a downward direction) until the lower edge of the display area. Then the area R2 is driven for touch sensing. Because the time when the display period is switched to the touch period is after the gate line located at the edge of the display area is scanned, the mura occurs at the upper edge and the lower edge of the display area and is difficult to be observed. Therefore, the disclosure provides another solution for the problem of boundary mura.

At last, since the time for driving the touch display period is assigned to the display driving operation and the touch driving operation, the display period is compressed in comparison with an ordinary display panel. This makes the GOP circuits be charged insufficiently and output weaker scan signals. In view of this problem, the disclosure can adjust the driving frequency of the touch display panel. For example, the frame rate can be reduced from 60 Hz to 50 Hz so as to increase the chare time for the GOP circuits.

According to the above embodiments, a touch display panel and a driving method thereof are provided to solve the problems wherein the signal is not transferred, mura occurs at the boundary of the areas, and the driving capability of the GOP circuits is reduced.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display panel driven in one of a plurality of display periods and one of a plurality of touch periods alternately, comprising:

a plurality of pixels disposed on the touch display panel;

a plurality of gate lines, each of which is connected to a row of pixels among the plurality of pixels and driven by a respective clock signal of a plurality of clock signals to output a scan signal during each of the plurality of display periods and stop the scan signal during each of the touch periods; and N dummy gate lines, each of which is not connected to the plurality of pixels and driven by a respective dummy clock signal of N dummy clock signals to output a dummy scan signal before a first display period among the plurality of display periods is switched to a first touch period among the plurality of touch periods, where N is equal to or greater than 1, wherein at least one of rising edges of the N dummy clock signals is synchronized with at least one of falling edges of the plurality of clock signals.

2. The touch display panel as claimed in claim 1, wherein there are N clock signals among the plurality of clock signals driving the last N gate lines among the plurality of gate lines respectively before the first display period is switched to the first touch period, wherein the rising edges of the N dummy clock signals are synchronized with the falling edges of the N clock signals respectively.

3. The touch display panel as claimed in claim 1, wherein each of the N dummy gate lines are driven by the respective dummy clock signal to output the dummy scan signal after the first touch period is switched to a second display period among the plurality of display periods, wherein at least one of falling edges of N dummy clock signals is synchronized with the at least one of rising edges of the plurality of clock signals.

4. The touch display panel as claimed in claim 3, wherein there are N clock signals among the plurality of clock signals driving the first N gate lines among the plurality of gate lines respectively after the first touch period is switched to the second display period, wherein the falling edges of the N dummy clock signals are synchronized with the rising edges of the N clock signals respectively.

5. A driving method of a touch display panel, the touch display panel comprising:

a plurality of pixels disposed on the touch display panel;
a plurality of gate lines, each of which is connected to a row of pixels among the plurality of pixels; and
N dummy gate lines, each of which is not connected to the plurality of pixels, wherein N is equal to or greater than 1,
wherein the driving method of the touch display panel comprises:

driving the touch display panel in one of a plurality of display periods and one of a plurality of touch periods alternately;
driving the plurality of gate lines by a plurality of clock signals to output a scan signal respectively during the plurality of display periods;
driving the N dummy gate lines by N dummy clock signals to output a dummy scan signal respectively before a first display period among the plurality of display periods is switched to a first touch period among the plurality of touch periods; and
synchronizing at least one of rising edges of the N dummy clock signals with at least one of falling edges of the plurality of clock signals.

6. The driving method of the touch display panel as claimed in claim 5, wherein there are N clock signals among the plurality of clock signals driving the last N gate lines among the plurality of gate lines respectively before the first display period is switched to the first touch period, wherein the rising edges of the N dummy clock signals are synchronized with the falling edges of the N clock signals respectively.

7. The driving method of the touch display panel as claimed in claim 5, comprising:

driving the N dummy gate lines by the N dummy clock signals to output the dummy scan signal respectively after the first touch period is switched to a second display period among the plurality of display periods; and
synchronizing at least one of falling edges of the N dummy clock signals with at least one of rising edges of the plurality of clock signals.

8. The driving method of the touch display panel as claimed in claim 7, wherein there are N clock signals among the plurality of clock signals driving the first N gate lines among the plurality of gate lines respectively after the first touch period is switched to the second display period, wherein the falling edges of the N dummy clock signals are synchronized with the rising edges of the N clock signals respectively.

* * * * *